United States Patent [19]
Yamamoto et al.

[11] Patent Number: 5,199,023
[45] Date of Patent: Mar. 30, 1993

[54] OPTICAL INFORMATION RECORDING MEDIUM WITH A SEPARATING PART BETWEEN INFORMATION TRACKS

[75] Inventors: Masakuni Yamamoto, Yamato; Shigeto Kanda, Machida, both of Japan

[73] Assignee: Canon Kabushiki Kaisha, Tokyo, Japan

[21] Appl. No.: 457,863

[22] Filed: Dec. 27, 1989

[30] Foreign Application Priority Data

Dec. 27, 1988 [JP] Japan .................................. 63-327946
Dec. 11, 1989 [JP] Japan .................................. 1-318853

[51] Int. Cl.⁵ .......................... G11B 3/70; G11B 5/85; G11B 7/26
[52] U.S. Cl. ................................. 369/275.4; 369/280
[58] Field of Search ................. 369/93, 96, 97, 272, 369/277, 279, 280, 283, 286, 13, 109, 275.1, 275.2, 275.3, 275.4; 360/131, 135

[56] References Cited

U.S. PATENT DOCUMENTS

| | | | |
|---|---|---|---|
| 4,587,648 | 5/1986 | Ando | 369/109 |
| 4,707,816 | 11/1987 | Yonezawa et al. | 369/275.2 |
| 4,734,904 | 3/1988 | Imanaka et al. | 369/109 |
| 4,912,311 | 3/1990 | Hasegawa et al. | 235/487 |
| 4,932,012 | 6/1990 | Kobayashi | 369/13 |
| 5,031,162 | 7/1991 | Morimoto et al. | 369/275.2 |
| 5,067,039 | 11/1991 | Godwin et al. | 369/275.1 |

FOREIGN PATENT DOCUMENTS

| | | |
|---|---|---|
| 0038499 | 10/1981 | European Pat. Off. . |
| 0092707 | 11/1983 | European Pat. Off. . |
| 0100995 | 2/1984 | European Pat. Off. . |
| 0240696 | 10/1987 | European Pat. Off. . |
| 61-172233 | 8/1986 | Japan ................................ 369/275.4 |
| 61-278052 | 12/1986 | Japan ................................ 369/275.4 |
| 1-171136 | 7/1989 | Japan ................................ 369/275.4 |
| 2-035637 | 2/1990 | Japan ................................ 369/275.4 |

*Primary Examiner*—Eugene R. LaRoche
*Assistant Examiner*—Michael C. Kessell
*Attorney, Agent, or Firm*—Fitzpatrick, Cella, Harper & Scinto

[57] ABSTRACT

An optical information recording medium includes a recording surface formed by a recording layer provided on a substrate, the recording surface being provided with parallel information tracks each divided into plural blocks, each of which is formed by a data area for information recording and a servo area for forming prepits for tracking signal detection, wherein the data area has a separating part the height of which is different from that of the information track and which is provided between information tracks adjacent to each other, and the difference in height is equal to or larger than the thickness of the recording layer, and wherein the servo area is not provided within the separating part.

10 Claims, 13 Drawing Sheets

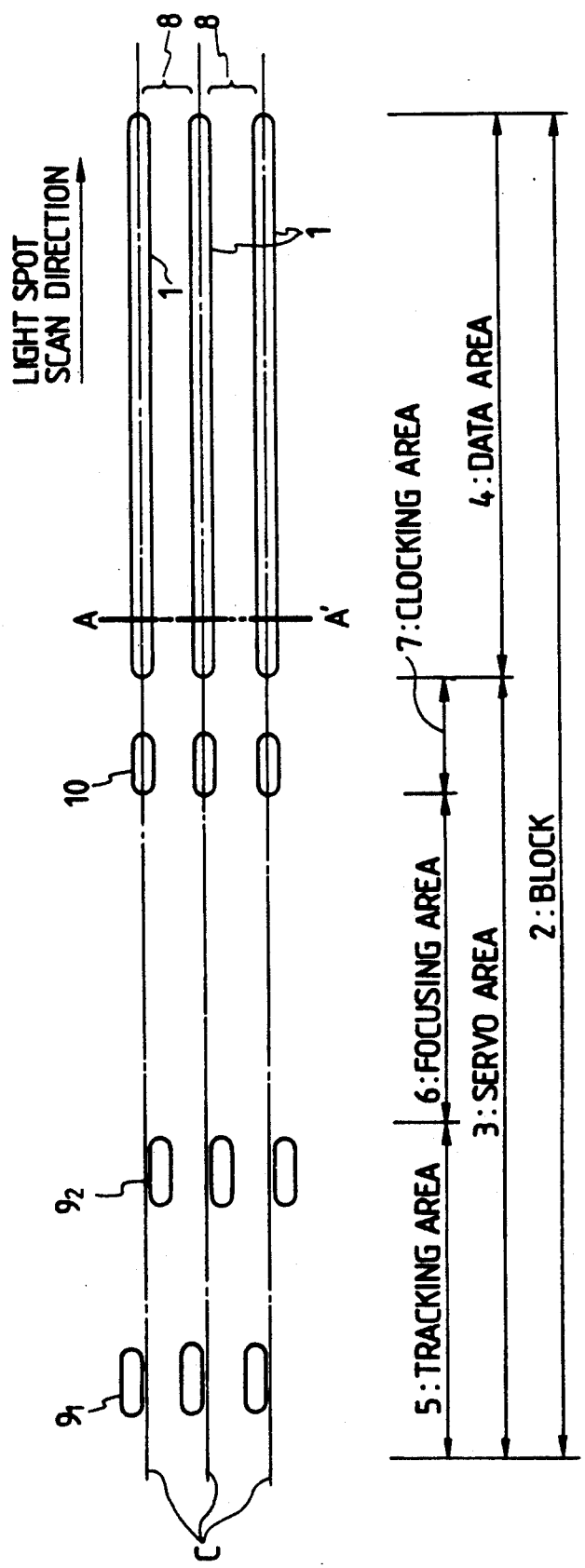

OPTICAL INFORMATION RECORDING MEDIUM WITH A SEPARATING PART BETWEEN INFORMATION TRACKS

BACKGROUND OF THE INVENTION

1. Field of the Invention

The present invention relates to an optical information recording medium capable of recording information by irradiation with a light beam, and more particularly to an optical information recording medium of a so-called sample servo type, in which prepits for detecting tracking signals are formed in a scattered manner along an information track.

2. Related Background Art

The optical memory industry expanding in recent years already encompasses various types of media such as optical video disks and compact disks for reproduction only and add-on, that is, direct read after write type optical disks utilizing thin metal films or coloring matter recording materials, and development is being made toward rewritable optical disks utilizing magneto-optical recording or phase transition recording. Also, the applications of such media are expanding from consumer uses to external memories of computers.

In such optical memories, particularly important are control technology for tracing a desired track with a small light spot, and record/reproducing technology for enabling high density recording and high speed signal reading.

In the field of control technology, there has been proposed a sample servo system, in which servo time and record/reproducing time are divided in time for excluding mutual crosstalk of signals.

FIG. 1 shows a part of a format of an optical disk of such a sample servo system. A block 50 is present in a number of 1,000 to 2,000 in a full turn of the disk. The block 50 is divided into a servo area 51 and a data area 52, and the servo area 51 is composed of a tracking area 53 containing wobbling pits 56, a focusing area 54 formed as a mirror surface, and a clocking area 55 containing a clock pit 57 for timing the data recording and reproduction.

The tracking operation is conducted according to the difference in the light amounts in reading the wobbling pits. Also, the focusing is achieved according to the change in reflected light amount from the mirror surface.

The sample servo method has the advantage of an absence of crosstalk or mutual interference of the signals, as the servo area and data area are mutually separated in time and space.

In the conventional optical disk employing such a sample servo method, the width of the recorded pits depends on that of the recording beam spot since the data area is formed as a mirror surface. As an example, the mode of recording on a magneto-optical disk is schematically shown in FIG. 2, wherein a magneto-optical disk 91 is composed of a transparent substrate 92 such as of acrylic resin or polycarbonate resin, and a magnetic recording layer 93 is formed thereon for example by sputtering. The information is recorded by irradiating the recording layer 93 with a light beam 105 focused through an objective lens 104 for heating the irradiated area, and simultaneously applying an external magnetic field by a device (not shown), thereby orienting the magnetization of the irradiated area into a desired direction. Thus, the information is recorded by the arrangement of magnetic domains (record pits) in which the direction of magnetization is different from that in other areas.

In the course of such recording, the temperature of the magneto-optical disk is highest, as shown in FIG. 2, at the center of the area irradiated with the light beam 105, and becomes gradually lower almost concentrically. Thus, a record pit of a width x is formed for the recording layer 93 with a Curie temperature of 200° C.

In such information recording, the records on mutually adjacent information tracks may mutually overlap if the automatic tracking contains an aberration. Also, in a rewritable recording medium, the information previously recorded and not completely erased may undesirably affect the reproduction of newly recorded information. As an example, FIGS. 3A to 3C illustrate the record pits in overwriting of information by modulating the external magnetic field in the above-mentioned magneto-optical disk. FIG. 3A is a plan view of pits (hatched areas) recorded without tracking error with respect to the center C of the track. On the other hand, FIG. 3B shows an overwriting, on the pits (indicated by hatched areas) deviated upwards with respect to the center C of the track, of new pits deviated downwards as indicated by broken lines. Such overwriting operation provides pits as shown in FIG. 3C. Such an unerased portion of previously recorded pits significantly deteriorate the quality of reproduced signals.

SUMMARY OF THE INVENTION

The object of the present invention is to provide an optical information recording medium of a sample servo method, capable of eliminating the above-mentioned drawbacks of the prior art and reducing the undesirable effect of error in tracking servo on the recorded pits.

The above-mentioned object can be attained, according to the present invention, by an optical information recording medium having a recording surface formed by a recording layer provided on a substrate, said recording surface being provided with parallel information tracks each divided into plural blocks each of which is formed by a data area for information recording and a servo area containing a prepit for detecting the tracking signal, wherein a separating part of a height different from that of the information track is provided between adjacent information tracks in said data areas but not in said servo areas, and the difference in said height is equal to or larger than the thickness of said recording layer.

BRIEF DESCRIPTION OF THE DRAWINGS

FIG. 4 is a schematic plan view of the recording surface of an embodiment of the optical recording medium of the present invention;

DESCRIPTION OF THE PREFERRED EMBODIMENTS

Figure 1:
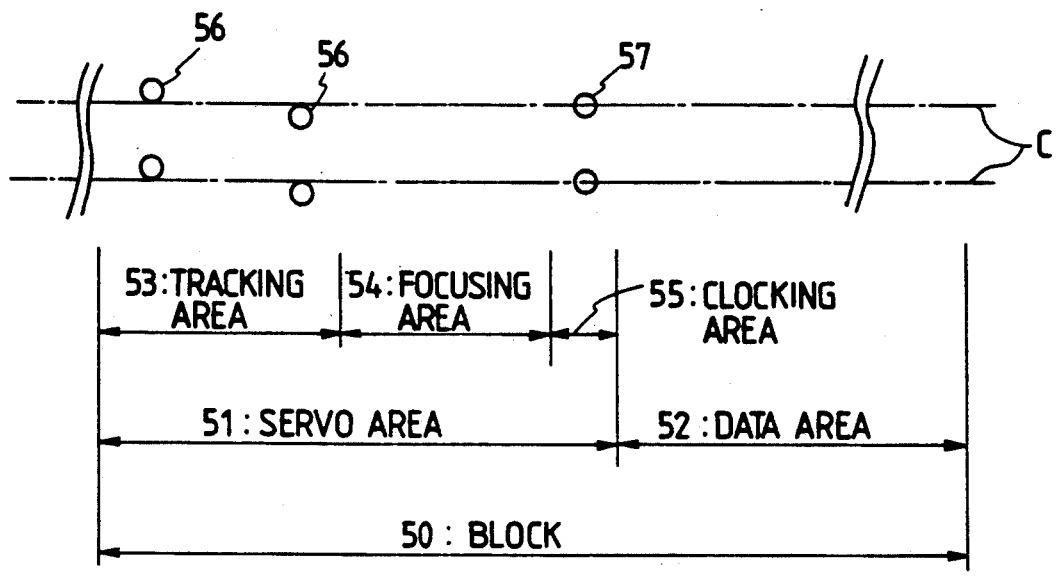
FIG. 1 is a schematic plan view of a recording surface showing the format of a conventional optical information recording medium.

Now the present invention will be clarified in detail by embodiments thereof, applied to a magneto-optical recording medium.

FIG. 4 is a schematic plan view of the recording surface of an embodiment of the optical recording medium of the present invention. On said recording surface there are formed plural parallel information tracks of which centers are indicated by C. In the case of a disk-shaped medium, the tracks are formed concentrically or spirally. The information track of one turn is divided into plural sectors, each of which is divided into plural blocks. Each block 2 is divided into a servo area 3 and a data area 4, and said servo area 3 comprises a tracking area 5, a focusing area 6, and a clocking area 7. The tracking area 5 contains wobbling pits $9_1$, $9_2$ respectively deviated in opposite directions with respect to the track center C. The focusing area 6 comprises a mirror surface without pits. The clocking area 7 is provided with a clocking pit 10 for synchronization with the clock signals for data reproduction.

A tracking signal and a focusing signal are respectively detected from the areas 5, 6 and used for automatic tracking (AT) and automatic focusing (AF). These signals are held until a next servo area successes to the data area 4. Therefore, in the data area 4, the automatic tracking and the automatic focusing are in a hold state. In the data area, a separating part of a height different from that of an information track is provided between the information tracks. In the present embodiment, the separating part 8 has the same height as the plane in which the pits $9_1$, $9_2$, 10 are formed.

Figure 5:
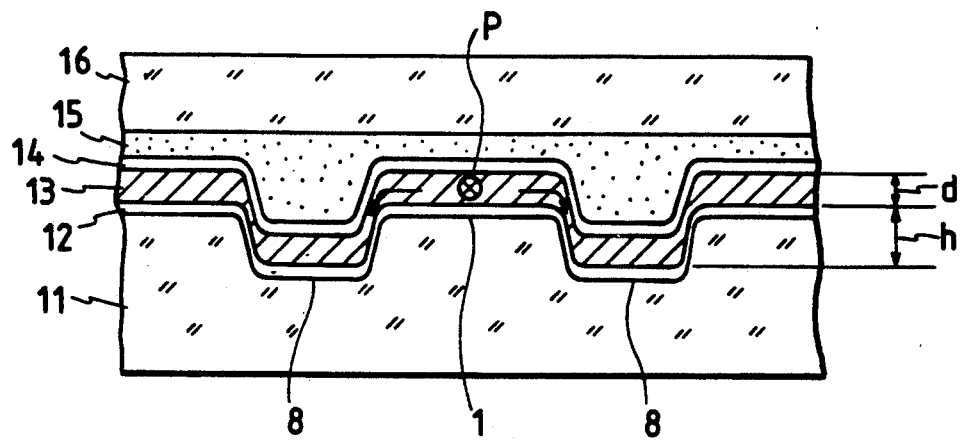
FIG. 5 is a cross-sectional view of the recording medium shown in FIG. 4.

FIG. 5 is a schematic cross-sectional view of the medium shown in FIG. 4, along a line A—A'. Referring to FIG. 5, on the surface of a transparent substrate 11 comprised, for example, of acrylic resin or polycarbonate resin, there are formed the pits and the separating part 8 mentioned above, in the form of surface irregularities, for example by injection molding. On said substrate 11, there are formed, in succession, a protective layer 12, a recording layer 13 and a protective layer 14, for example, by sputtering. The recording layer 13 advantageously comprises an amorphous magnetic alloy such as TbFeCo or GdFeCo. The protective layers 12, 14 usually comprises gas-tight dielectric films such as $Si_3N_4$ for preventing the corrosion of the recording layer 13. On the protective layer 14, there is adhered a protective substrate 16 likewise comprised of polycarbonate resin or the like, by means of an adhesive layer 15.

Figure 2:
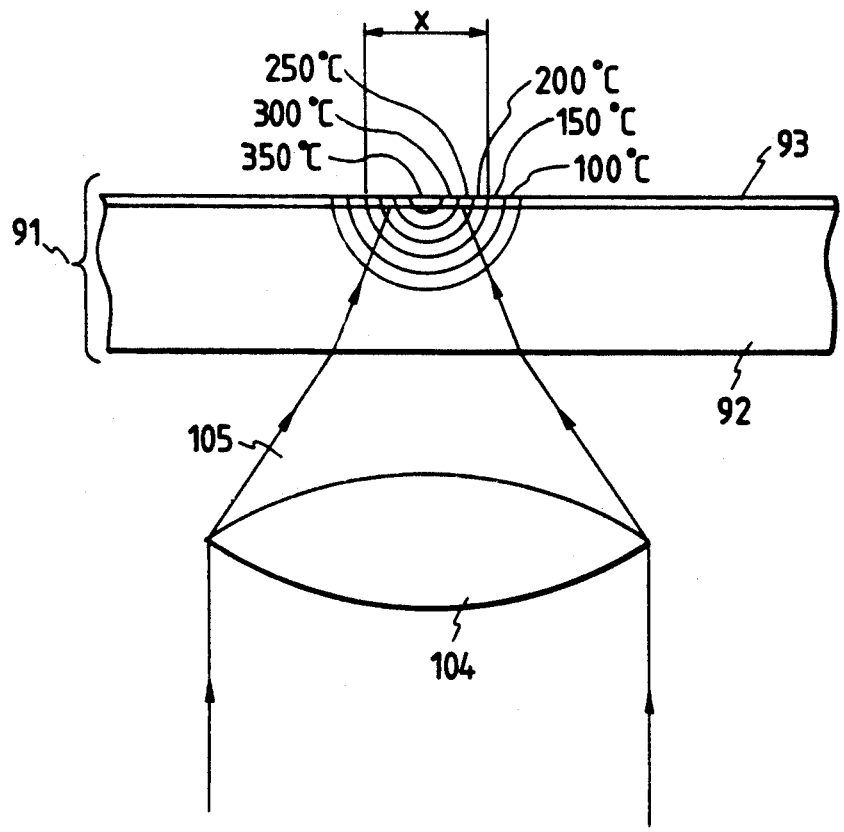
FIG. 2 is a schematic cross-sectional view showing the mode of recording in a conventional recording medium.

The separating part 8 serves to limit the width of the record pit, in the information recording in the data area on the information track. If the center of the light beam spot falls on a point P, thereby locally heating the vicinity thereof, heat diffuses according to the thermal conductivity of the layers. The thermal conductivity (in W/cm.deg) of the constituents is $5 \times 10^{-4}$ for polycarbonate; $4 \times 10^{-2}$ for $Si N_4$; $1.3 \times 10^{-1}$ for TbFeCo alloy; and $1.4 \times 10^{-1}$ for GdTbFe alloy. Since the thermal conductivity of the recording layer 13 is higher than that of other layers, the heat propagates along the recording layer 13. In the medium of the present invention, however, due to the presence of the separating part 8 between the neighboring information tracks, the heat is transmitted along a bent path in the direction of the width of the tracks, so that the effective thermal conduction path becomes longer. Consequently, the isothermal lines as shown in FIG. 2 are compressed in the direction of the width of the track, and the width of the record pit formed by the heat is limited within the information track 1.

Figure 6:
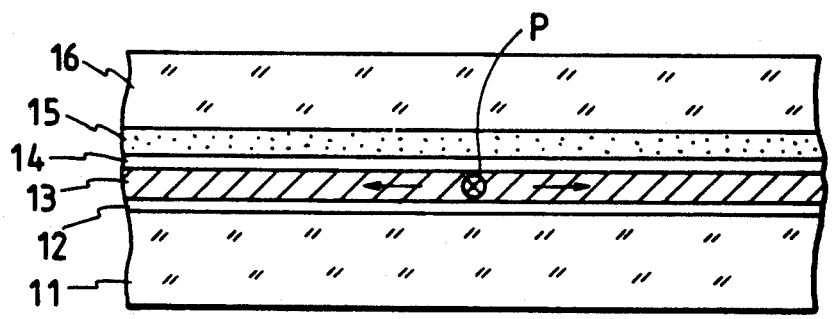
FIG. 6 is a cross-sectional view of a recording medium not provided with the separating part.

On the other hand, in the absence of the separating part as shown in FIG. 6, the heat given to the vicinity of the point P by the light beam diffuses without limitation in the direction of the width of the track, so that the record pit may overflow to the neighboring track or may not be completely erased in the overwriting, in the case of a tracking error as explained above.

Figure 7:
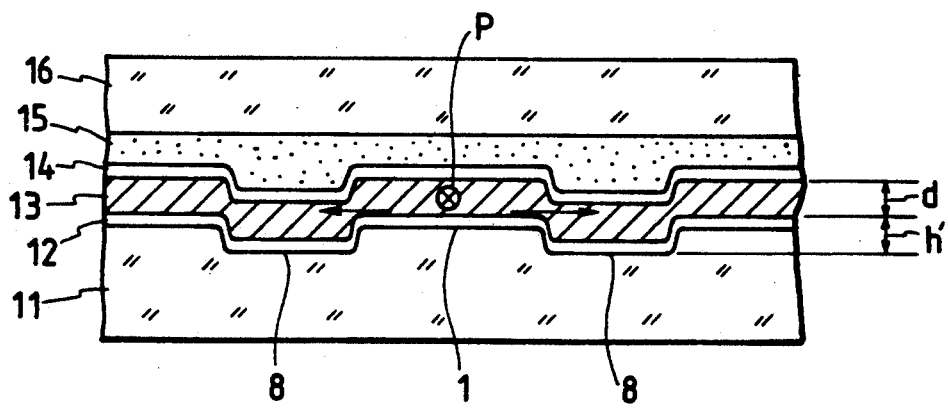
FIG. 7 is a cross-sectional view of a recording medium with separating parts of a low height.

In the medium of the present invention, as shown in FIG. 5, the difference h in height between the information track and the separating part has to be equal to or larger than the thickness d of the recording layer, because, if the height difference h' is smaller than the thickness d of the recording layer as shown in FIG. 7, there will result a linear thermal conduction path as indicated by the arrow in the direction of the width of the track whereby the effect of limiting the pit area cannot be sufficiently realized. On the other hand, the separating part 8 is generally formed by injection molding during the preparation of the substrate. Consequently, in consideration of the mold releasing, an excessively large height difference between the separating part 8 and the track is not desirable. In consideration of the foregoing, the height difference between the information track and the separating part is preferably selected to be approximately equal to the thickness of the recording layer. The thickness of the recording layer is generally selected in a range from 200 to 1,000 Å.

As already known, the prepit in the servo area is often formed with a depth of $\lambda/4n$ in order to maximize the amplitude of the detected signal, wherein $\lambda$ is the wavelength of the reproducing light beam, and n is the refractive index of the substrate. As explained above, the prepit and the separating part are formed by injection molding, and the master mold employed in the molding is prepared by a photolithographic process. In such a process, the prepit and the separating part can be pattern exposed at the same time, if the depth of the prepit is equal to the height of the separating part. Therefore, in consideration of the ease of preparation of the master mold, the height difference between the information track and the separating part is preferably selected to be equal to $\lambda/4n$. On the other hand, in consideration of the influence, at the reading of the information recorded in the data area of the information track, of the separating part on the readout signal, the height difference is preferably selected to be equal to $\lambda/2n$, because such a height difference will provide a phase difference of 360° between the reproducing light beam reflected by the information track and that reflected by the separating part.

FIGS. 6 and 7 are schematic cross-sectional views of recording mediums, along a direction of the width of the information tracks, wherein the same components same as those in FIG. 5 are represented by the same symbols and will not be explained further.

In the following there will be explained the method of detecting the tracking signal from the medium of the present invention.

Figure 8:
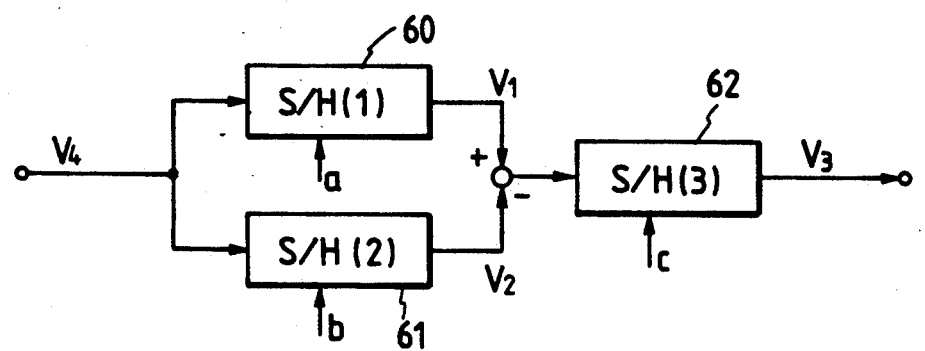
FIG. 8 is a diagram of a circuit for extracting tracking signals from the recording medium of the present invention.
Figure 9:
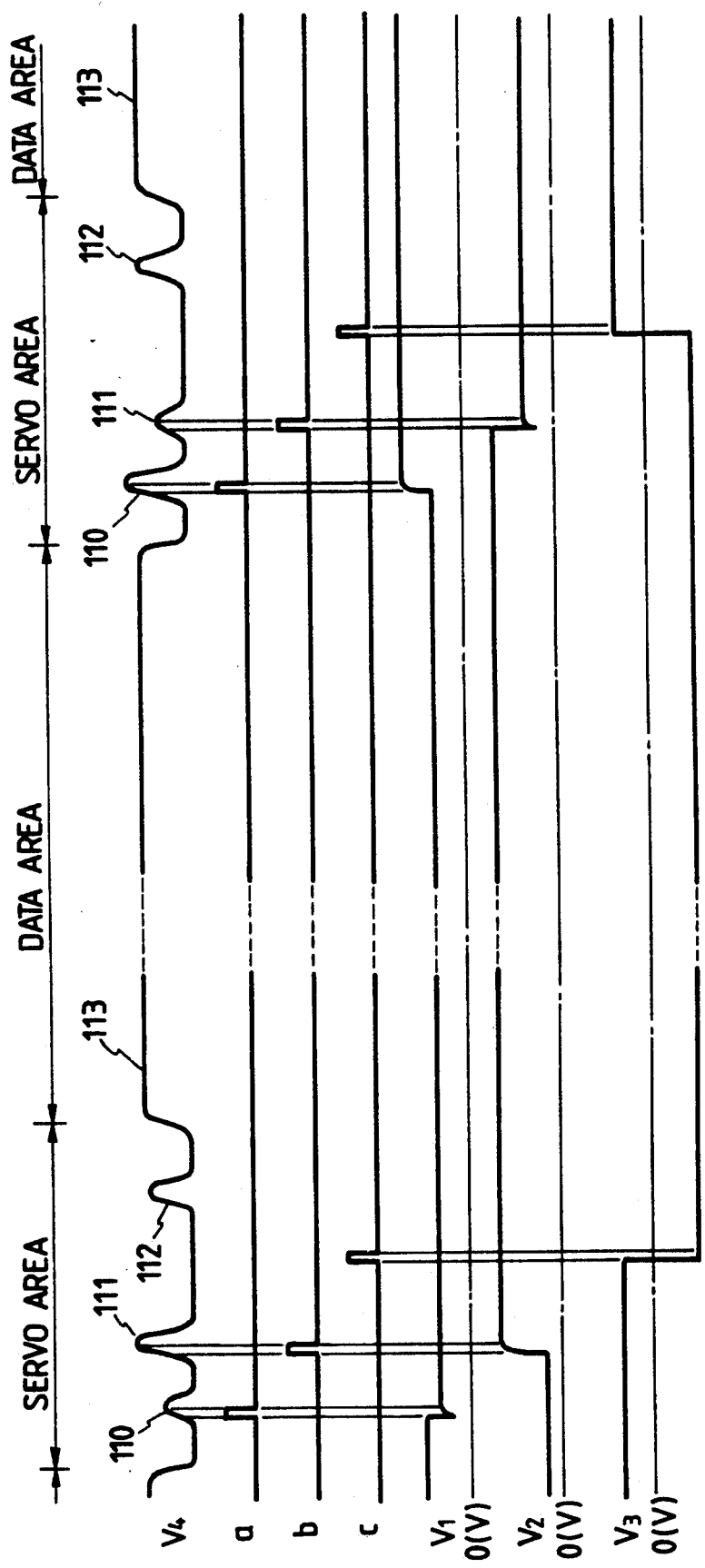
FIG. 9 is a wave form chart of the signals in various parts of the circuit shown in FIG. 8.

FIG. 8 is a block diagram of a tracking signal detecting circuit, and FIG. 9 is a wave form chart showing signals in various parts of the circuit in FIG. 8. In both drawings, the same signal is represented by the same symbol. In FIG. 8, an output signal V4 of an unrepresented photodiode receiving the light reflected from the medium is supplied to two sample-hold circuits 60, 61, which are respectively controlled by signals a and b. The circuit 60 or 61 samples the signal V4 when the signal a, or b is at the logic level "1", and starts the holding operation when the signal a, b is shifted from the logic level "1" to "0".

The circuits 60, 61 respectively release output signals V1, V2. A third sample-hold circuit 62 receives the signal obtained by subtracting the signal V2 from V1. Said circuit 62 is controlled by a signal c in the same manner as the circuits 60, 61 are controlled by the signals a, b, and release an output signal V3.

In the signal V4 shown in FIG. 9, there are shown detection signal waves 110, 111 respectively corresponding to the front wobble pit $9_1$ and the rear wobble pit $9_2$ shown in FIG. 4, a detection signal wave 112 for the clock pit 10, and a detection signal wave 113 for an information track in the data area. As shown in FIG. 9, the signals a, b are generated, by an unrepresented timing circuit, at such timing as to respectively hold the peak values of the front wobble pit signal wave 110 and the rear wobble pit signal wave 111. Also, the signal c is generated at approximately center between the rear wobble pit and the clock pit. Thus, the peak value of the front wobble pit signal wave 110 is held, as the signal V1, until next front wobble signal wave is generated, while that of the rear wobble pit signal wave 111 is held, as the signal V2, until the next rear wobble pit signal wave. The signal V3, corresponding to the difference of the signals V1 and V2, is switched at the middle of the rear wobble pit signal wave 111 and the clock pit signal wave 112, and is held until the next middle point. The signal V3 serves as the tracking signal. Since the tracking signal is held in this manner during the data area, it is not affected by the pits recorded on the information track.

The focusing signal is also subjected to sample holding at the middle between the rear wobble pit signal wave 111 and the clock pit signal wave 112 shown in FIG. 9 in the same manner as the tracking signal, and is therefore not affected by the record pits.

Figure 10:
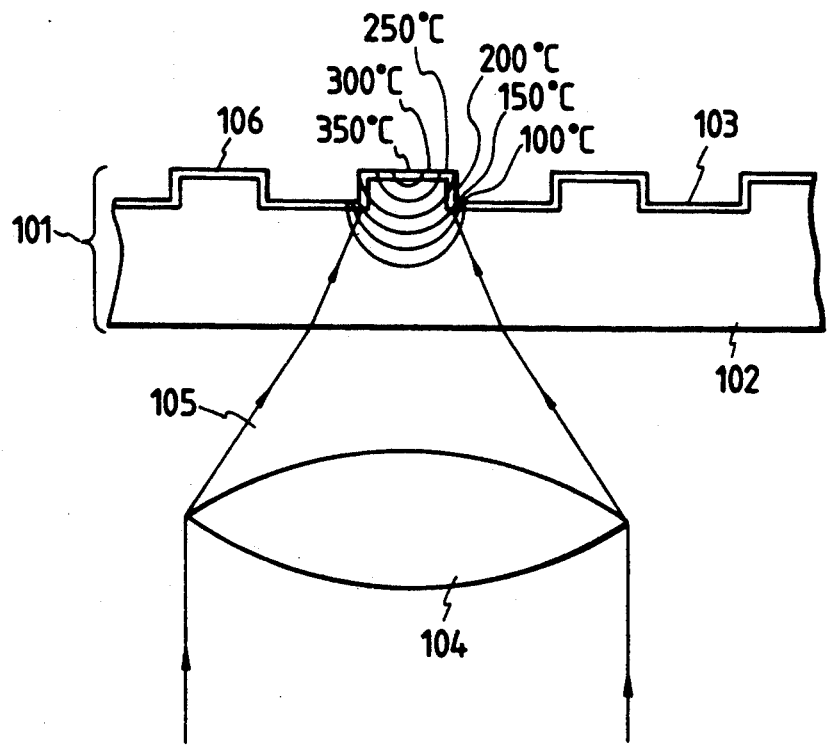
FIGS. 10 and 11 are schematic cross-sectional views showing the mode of recording in the recording medium of the present invention.
Figure 11:
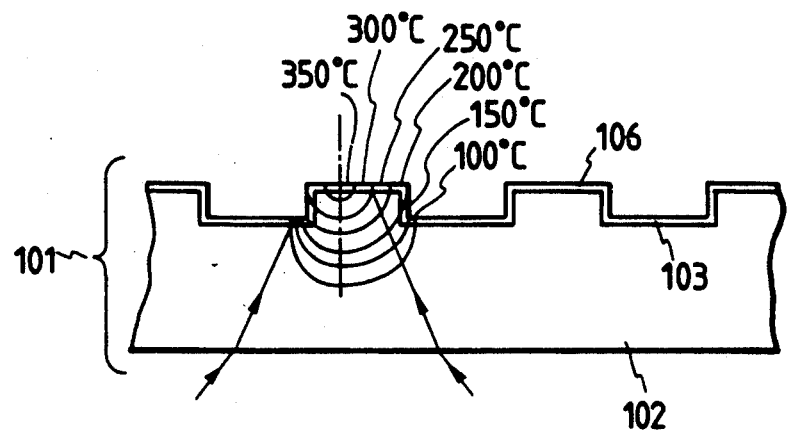

FIGS. 10 and 11 schematically show the mode of recording on the medium of the present invention, wherein illustrated are a magneto-optical disk 101, a transparent substrate 102, a separating part 103, an objective lens 104, a light beam 105, and an information track 106 in the data area. When the information track 106 is irradiated with the light beam 105, the temperature distribution is concentrated in the information track 106 as indicated by the isothermal lines in FIG. 10, since the separating part 103 hinders the heat diffusion in the direction of the width of the track. Consequently, the overflow of the recorded pit from the information track is suppressed even when the center of the light beam spot is aberrated from the center of the information track as shown in FIG. 11 due to a certain tracking error.

Figure 12:
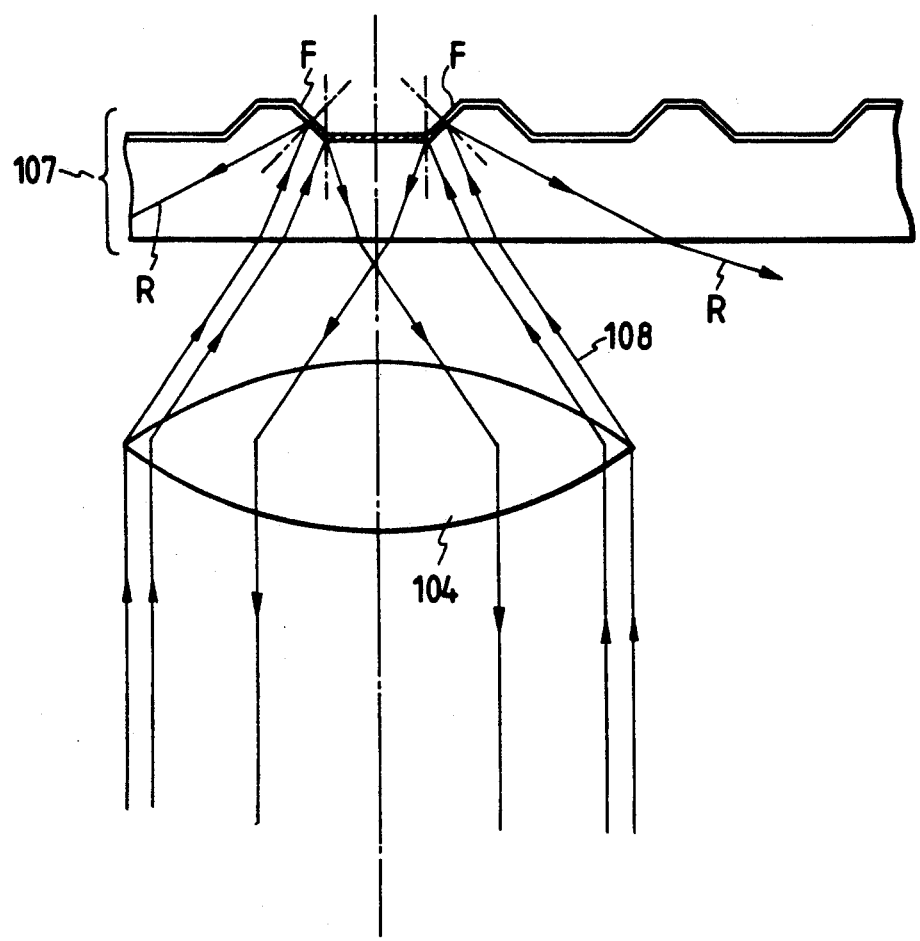
FIG. 12 is a schematic cross-sectional view showing the mode of record pit reading in the recording medium of the present invention.

In the foregoing embodiment, the boundary between the information track and the separating part is assumed to be vertical to the recording surface. In practice, however, the boundary is inclined from the vertical plane to the recording surface as shown in FIG. 12, in order to improve the releasing property of the substrate from the mold during the injection molding. Also, in such a case there can be similarly obtained the effect of preventing the thermal diffusion outside the information track at the recording. In this case, the record pit is also formed on the inclined boundary surface. However, such a record-pit formed on the boundary surface, even if not completely erased during the overwriting, does not undesirably affect the readout of the renewed information. As an example, let us assume that a record pit is formed in the hatched area, in FIG. 12, of the magneto-optical disk 107. When said record pit is irradiated with the reproducing light beam 108 through the objective lens 104, the light reflected by the information track 106 again passes the objective lens 104 and is detected by an unrepresented detector, but the light reflected by the boundary surface F between the separating part and the information track does not return, as indicated by an arrow R, to the objective lens. Consequently, the pit formed on said boundary surface F does not affect the reproduced signal.

Figure 13:
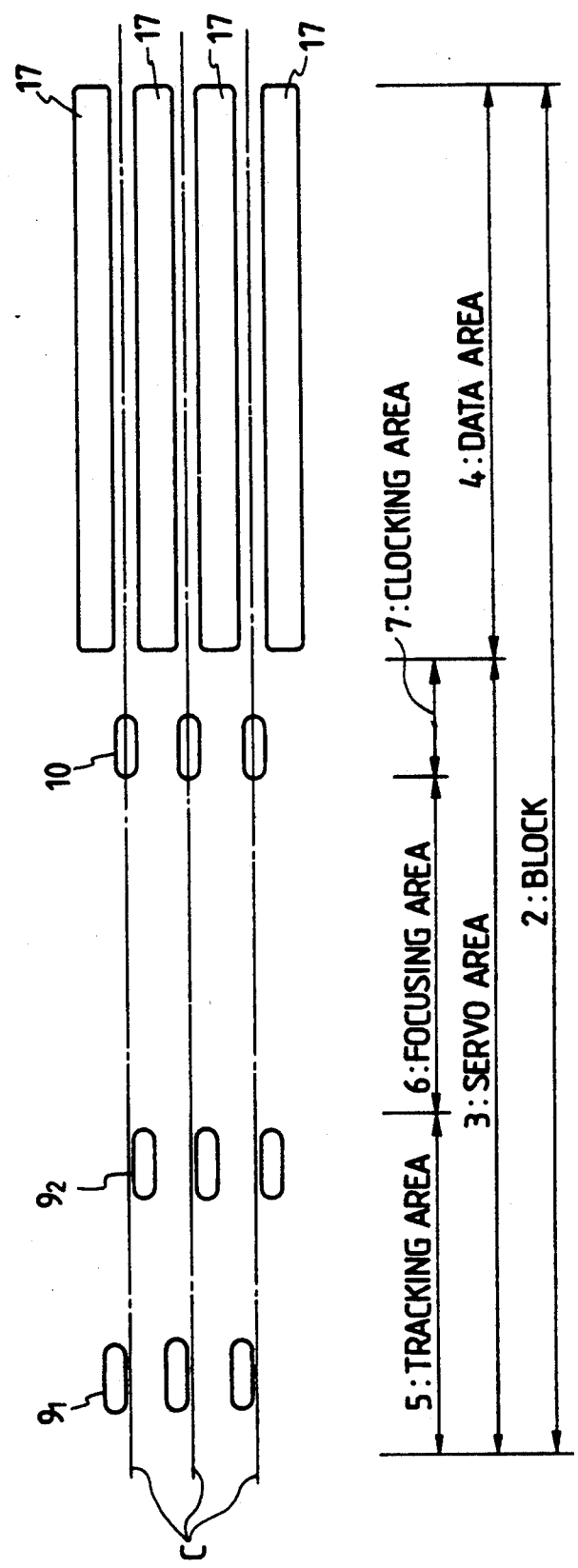
FIG. 13 is a schematic plan view of the recording surface of another embodiment of the optical recording medium of the present invention.

In the foregoing embodiments, the surface of the servo area having the prepits is of the same height as that of the separating part, but it is also possible, as shown in FIG. 13, to form the prepit-bearing surface at the same height as that of the information track in the data area and to form the separating part 17 as a groove or a protruding part. In FIG. 13, the same components as those in FIG. 4 are represented by the same symbols and are not explained further.

The recording medium of the present invention is usable in various recording methods, and is particularly applicable to a method of recording digital signals of at least three values by varying the position of the record pit in the direction of the width of the information track, as will be explained in the following.

Figure 14:
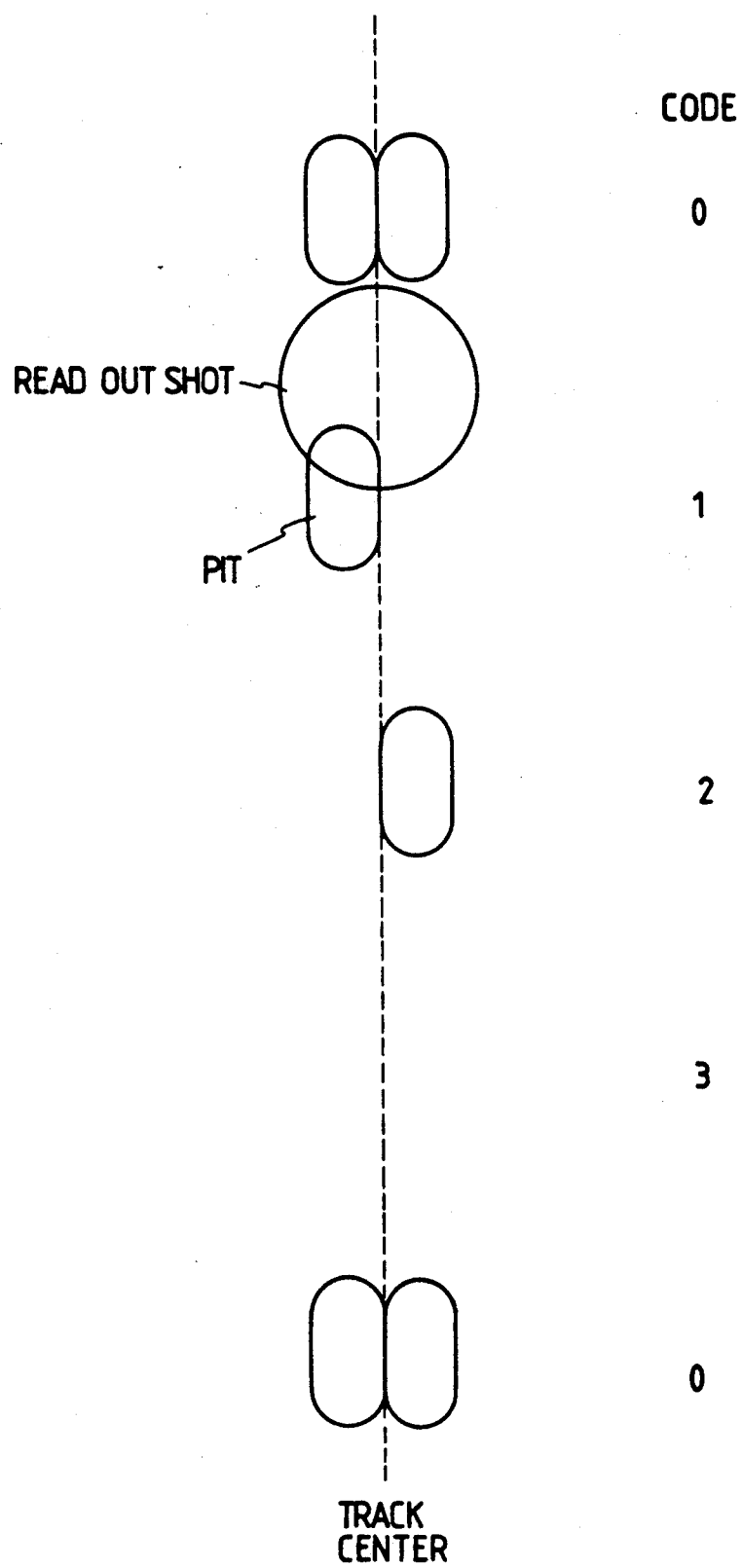
FIG. 14 is a schematic plan view showing multivalue recording with the recording medium of the present invention.

FIG. 14 shows a multi-value recording method utilizing the optical information recording medium of the present invention.

The pits constituting units in the recording are formed in two positions deviated, from the center of the track, by about a half of the width of the pit. Codes "0", "1", "2" and "3" are represented in the following manner: "0" by two unit pits formed at the left and right to form a pit of doubled width the center on the track center, "1" by a unit pit formed at left, "2" by a unit pit formed at right, and "3" by the absence of the pit. This method provides four-value recording, but the recording of a larger number of values, by increasing the positions of unit pits, for example at three positions, namely at positions displaced to the left and right by a half pit width and at the track center.

Figure 15:
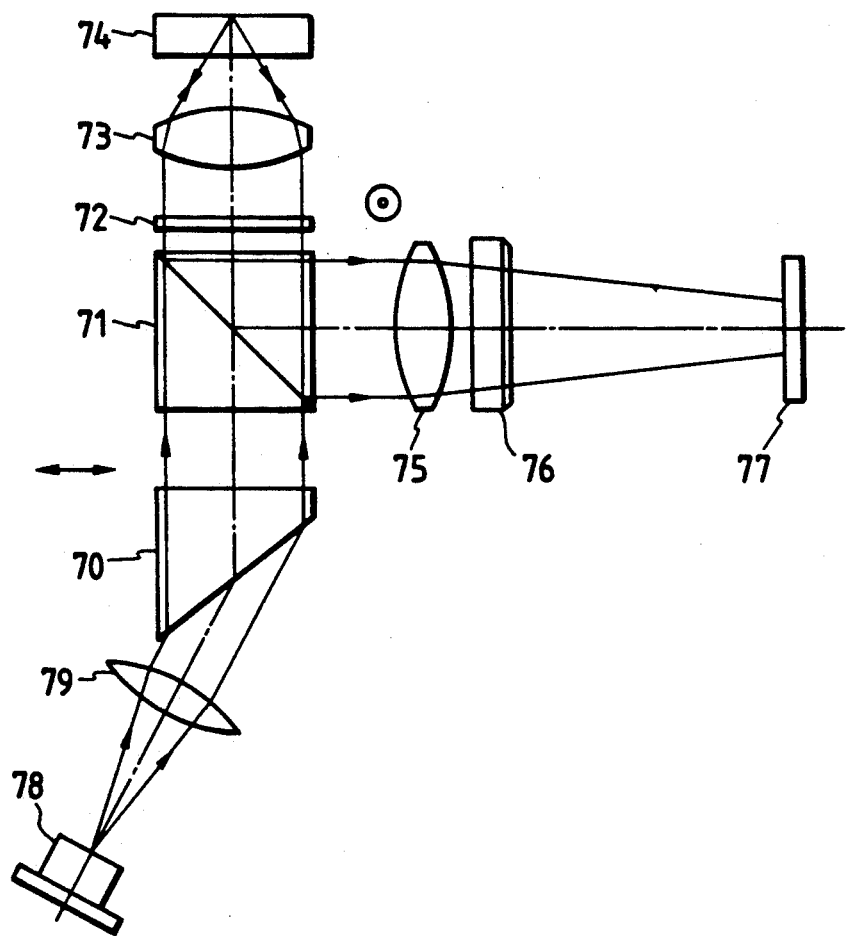
FIG. 15 is a view showing an example of the optical system for recording on and reproduction from the recording medium of the present invention.

FIG. 15 shows an optical system usable in the recording and readout of four-value recording shown in FIG. 14, on the recording medium of the present invention constituting an add on optical disk. In FIG. 15 there are shown a semiconductor laser 78, a collimating lens 79, a beam shaping prism 70, a polarizing beam splitter 71, a ¼-wavelength plate 72, an objective lens 73, a magneto-optical disk 74, a condenser lens 75, a cylindrical lens 76, and a 4-segmented photodetector 77. The light emitted by the semiconductor laser 78 is polarized linearly in the plane of the drawing, and is converted into a light beam of circular section through the collimating lens 79 and the beam shaping prism 70. The beam is mostly transmitted by the polarizing beam splitter 71, and is converted into a circularly polarized light by the ¼-wavelength plate 72. Then, the objective lens 73 forms a small light spot on the magneto-optical disk 74. A desired track is scanned with the small light spot for writing or reading of the information. The reflected light from the disk 74 is converted again into a parallel beam by the objective lens 73, then of drawing by the ¼-wavelength plate 72 and reflected by the polarizing beam splitter 71. The beam is then given an astigmatism by the condenser lens 75 and the cylindrical lens 76, and enters the 4-segmented photodetector 77 placed at a position where the cross section of the light beam becomes circular when the optical disk is in focus. A dividing line of the 4-segmented photodetector 77 is placed parallel to the image of the track while the generation line of the cylindrical lens 76 is placed at an angle of 45° to said dividing line. The auto focusing is effected by the astigmatism method, while the auto tracking is conducted by the heterodyne method in comparison with the beam in the focused state. It is to be noted that the image is rotated by 90° on the 4-segmented photodetector 77 because of the astigmatism system. The polarizing beam splitter 71 and the ¼-wavelength plate 72 may be replaced by a non-polarizing beam splitter. It is also possible to place a beam splitter between the polarizing beam splitter 71 and the condenser lens 75 thereby splitting the light beam, and to place a condenser lens and a 4-segmented photodetector in the newly formed optical path, thereby detecting an error signal for auto focusing in the first-mentioned optical path and an error signal for auto tracking in the last-mentioned optical path.

Figure 16:
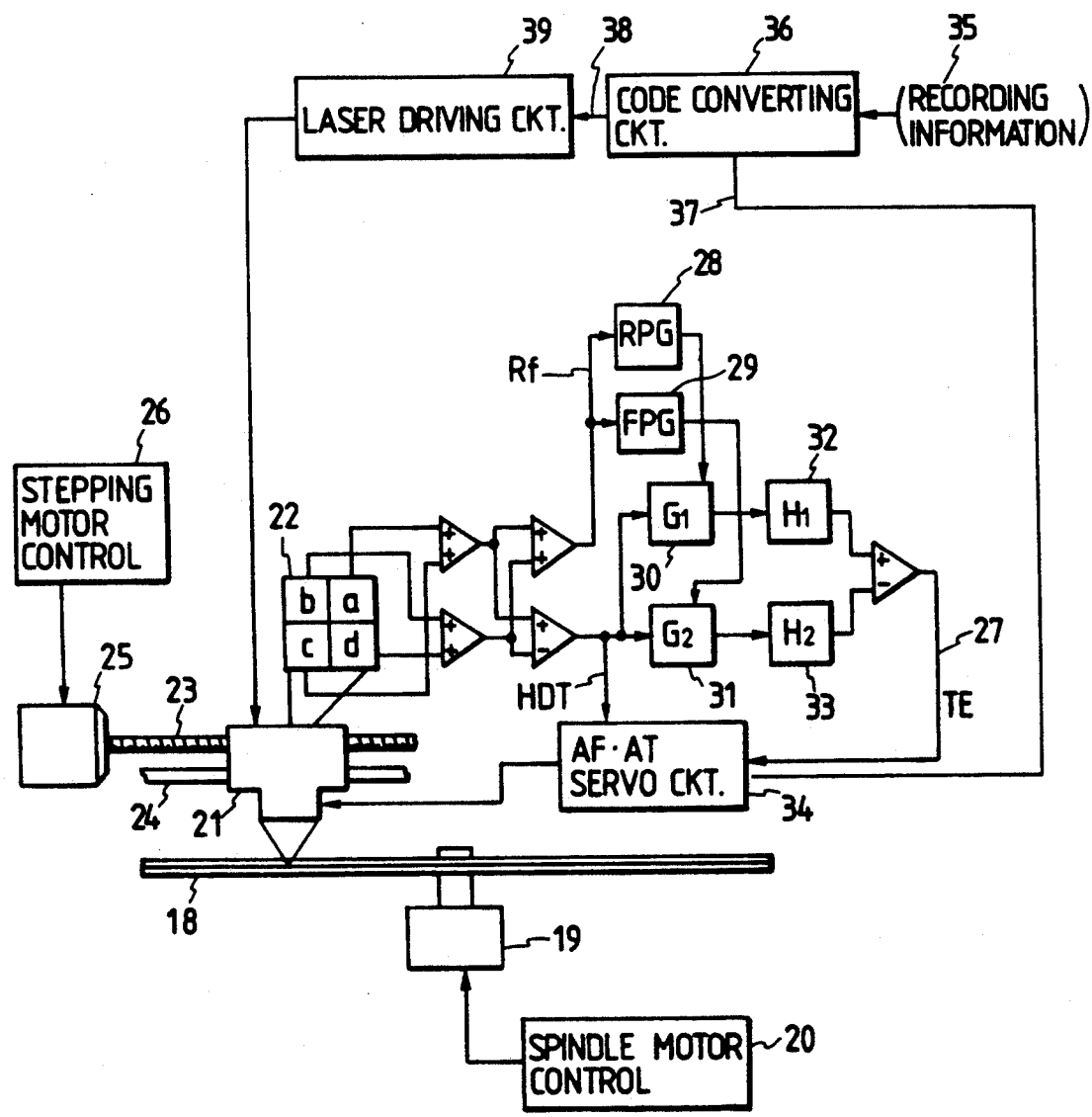
FIG. 16 is a block diagram of an apparatus for recording information on the recording medium of the present invention.

FIG. 16 is a block diagram for information recording by the multi-value recording method, wherein shown are a magneto-optical disk 18, a spindle motor 19, a spindle motor controller 20, an optical head 21, a 4-segmented photodetector 22, a feed screw 23, a guide shaft 24, a stepping motor 25, a stepping motor controller 26, a rising pulse generator 28, a falling pulse generator 29, gates 30, 31, hold circuits 32. 33, and an AF-AT servo circuit 34.

The optical disk 18 is rotated at a constant angular velocity over the entire disk or in each of the areas thereof, by the spindle motor 19 and the spindle motor controller 20.

The optical head 21 comprises the optical system shown in FIG. 15, an actuator etc. For the purpose of clarity, in FIG. 16, the 4-segmented photodetector 22 is extracted from the optical head 21. The optical head 21 is guided by the feed screw 23 and the guide shaft 24, and can be positioned on an arbitrary track by radial displacement by the stepping motor 25, with respect to the magneto-optical disk 18. The stepping motor 25 is controlled by the stepping motor controller 26. The reflected light from the disk enters the 4-segmented photodetector 22, and electrical signals from the segments a, b, c, d of the detector are used for calculating an Rf signal and an HDT (focusing error) signal:

$$Rf = (a+b+c+d)$$

$$HDT = (a+c)-(b+d)$$

These signals are divided in time, more specifically by a tracking period, a focusing period, and a write/reading time for use for respective purposes, according to the format on the magneto-optical disk. In the tracking period, a tracking error signal TE 27 can be obtained by the already known heterodyne method, in consideration of a fact that the image on the 4-segmented photodetector 22 is rotated by 90°, and in consideration of the in-focus state. In a case of scanning along the center of the track, the AF-AT servo circuit 34 effects the auto tracking by sending an auto tracking servo signal to the actuator of the optical head 21 so as cause the tracking error signal TE 27 to become equal to zero, and holds the tracking until the next tracking period. In the focusing period, the HDT signal serves as a focusing error signal by the astigmatism method utilizing the mirror surface. The AF-AT servo circuit 34 effects the auto focusing by sending an AF servo signal to the actuator of the optical head 21 so as to cause the HDT signal to become equal to zero, and holds the focusing until the next focusing period.

Now, information recording will be explained. The information 35 to be recorded is converted, in an encoding circuit 36, into a combination of the central position of a pit in the direction of the width of a track, the pit width and the presence, or absence of a pit, as explained above. This combination is represented by the presence or absence of a unit pit and the position thereof in the direction of the width of the track.

A signal 37 indicating the position of the unit pit is supplied to the AF-AT servo circuit 34, as an offset amount of the auto tracking. Thus, a single track is scanned by the number of positions of the unit pit.

In the four-value recording shown in FIG. 14 and utilizing two unit pit positions, in the first scanning operation, for example, the actuator of the optical head 21 is given a signal for offsetting the auto tracking by about a half of the pit width in the "+" side. At the same time, a signal 38 indicating the presence/absence of unit pits corresponding to that side is supplied to a laser driving circuit 39, thereby varying the intensity of the laser in the optical head 21 and forming unit pits in the data area on the magneto-optical disk 18. In the second scanning, the auto tracking is offset for scanning at the "−" side, thereby forming unit pits in the corresponding position.

Figure 17:
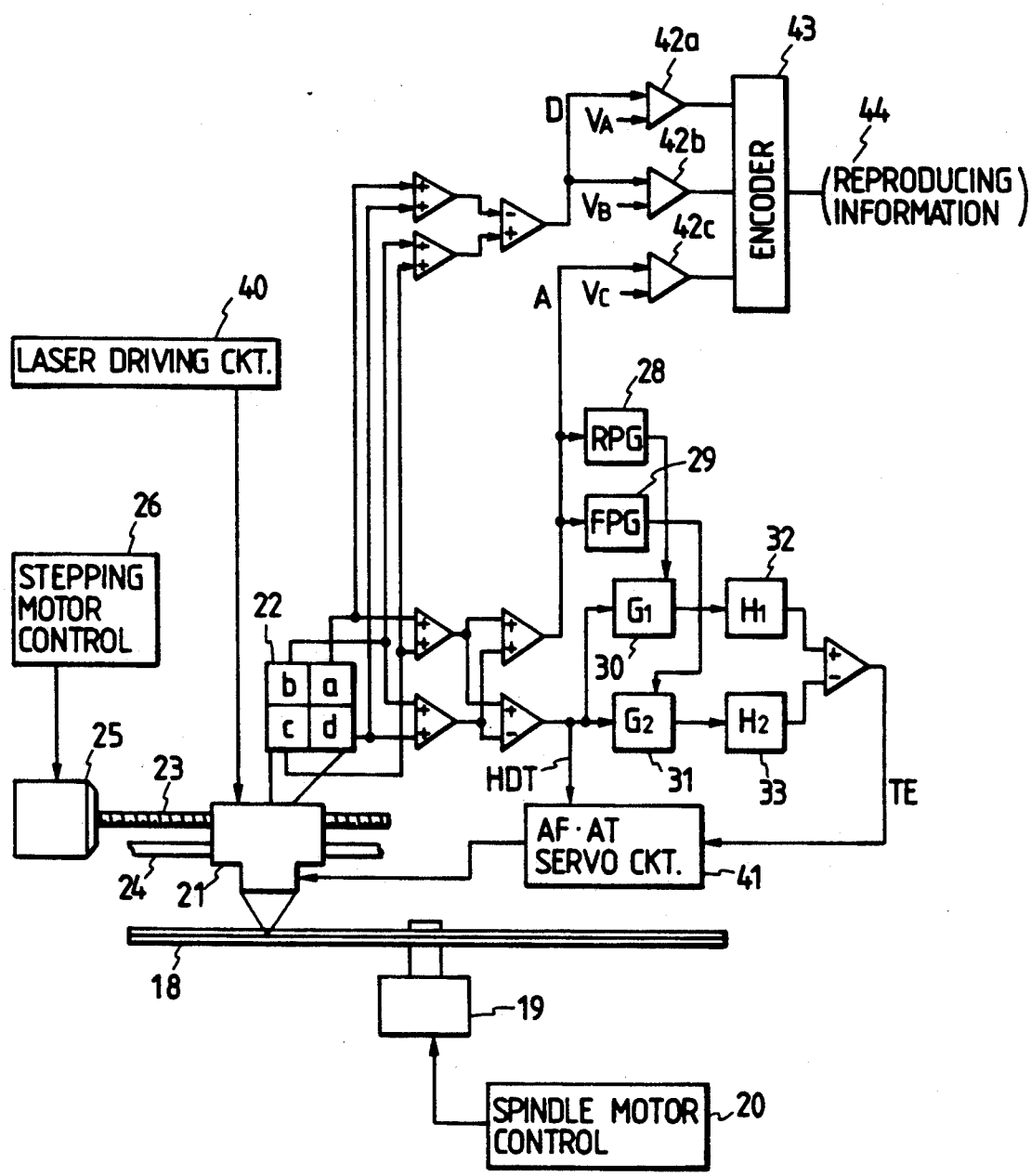
FIG. 17 is a block diagram of an apparatus for reading information from the recording medium of the present invention.

FIG. 17 is a block diagram of an apparatus for reading the thus recorded information, wherein shown are a laser driving circuit 40, comparators 42-a, 42-b, 42-c, and an encoder 43. The error signals for auto tracking and auto focusing can be obtained in the same manner as in FIG. 16. In the reading period, the light beam spot is maintained at a constant reading intensity by the laser driving circuit 40, and is so controlled as to scan along the center of the track by the AF-AT servo circuit 41. It is assumed that the pits constitute 4-value recording shown in FIG. 14, and the following signals A, D are formed from the segments a, b, c, d of the 4-segmented photodetector 49:

$$A = (a+b+c+d)$$

$$D = (b+c) - (a+d)$$

Figure 18:
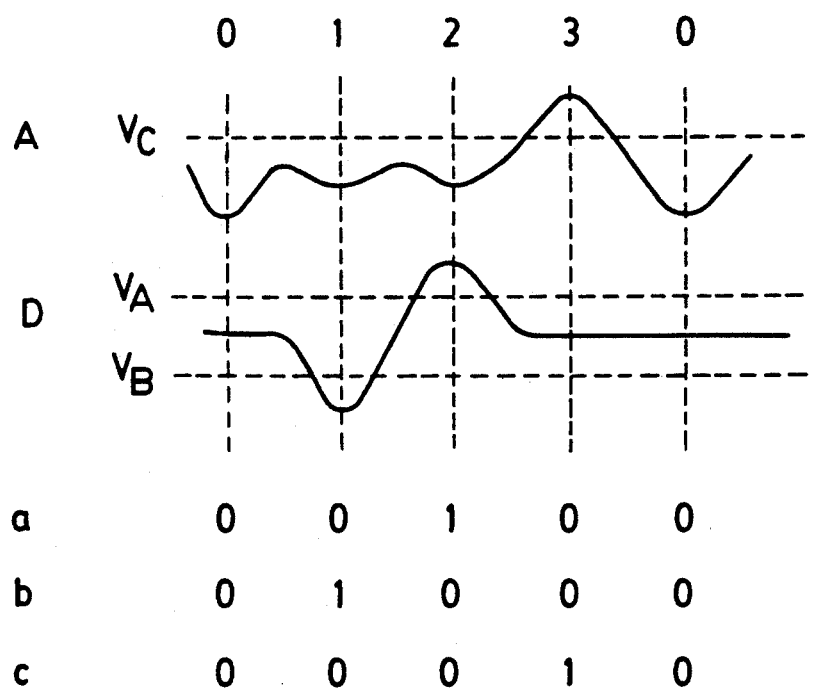
FIG. 18 is a view showing multi-value record pits formed on the recording medium of the present invention, and detected signals corresponding thereto.

FIG. 18 is a timing chart of these signals. The sum signal A of the segmented photodetector is used for detecting the presence of a pit on the track, and becomes lower than a reference voltage Vc of the comparator 42-c in the presence of a pit. The comparator 42-c digitizes the signal by giving a value "1" above the slicing voltage $V_C$, thus obtaining a binary signal as indicated by c in FIG. 18. The difference signal D is used for detecting the central position, of pit in the direction of the width of the track. The difference signal D is between reference voltages $V_A$ and $V_B$ of the comparators 42-a, 42-b in the presence of a pit symmetrical to the center of track or in the absence of a track, and becomes higher than VA or lower than $V_B$ if the pit center is aberrated above or below the center of the track, respectively. The comparator 42-a effects digitization with the value "1" above the slicing voltage $V_A$ to obtain a binary signal as shown by a in FIG. 18, while the comparator 42-b effects digitization with the value "1" below the slicing voltage $V_B$ to obtain a binary signal b in FIG. 18. The binary signals a, b and c are decoded into the corresponding codes 0, 1, 2 and 3 by the encoder 43, thus providing the reproduced information.

Figure 3A:
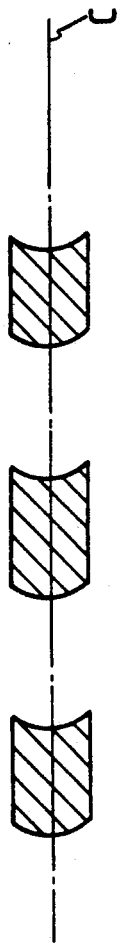
FIGS. 3A to 3C are schematic plan views of record pits in overwriting in a conventional magneto-optical recording medium.
Figure 3B:
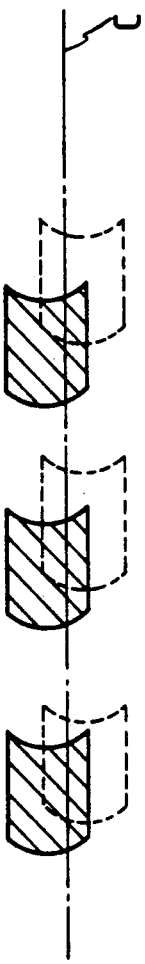
Figure 3C:
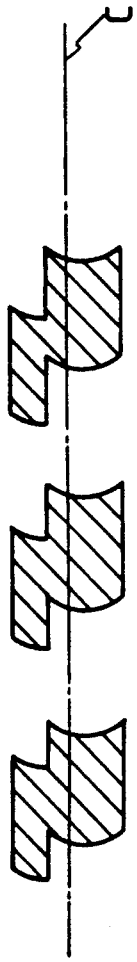

The optical information recording medium of the sample servo method utilizing the separating part of the present invention as shown in FIG. 3, when applied to the multi-value recording explained above, can achieve high-density recording since satisfactory recording is ensured even with a smaller track width, as it is rendered possible to prevent the overflow of the pit into the adjacent tracks, thus avoiding any influence of the recorded pit on the adjacent tracks.

In the recording and reproducing operations explained above, the size of the light beam spot is preferably made smaller in the recording than in the reproduction. However, the same apparatus can be used for recording and reproduction, by reducing the size of the light beam spot in recording in comparison with that in reproduction by employing light sources of two different wavelengths, the shorter wavelength being used for recording and the longer one for reproduction. In such a case the recording and reproduction may employ different optical heads or a common optical head.

It is also possible to employ the light source of a single wavelength and to employ an optical head with a larger numerical aperture for recording and another optical head with a smaller numerical aperture for reproduction.

It is furthermore possible to employ a light source and an optical head for both recording and reproduction, by selecting the optical recording medium and the intensity of the recording light beam in such a manner that the width of the formed unit pit becomes smaller than the size of the recording light beam.

The present invention is not limited to the foregoing embodiments but is subject to various modifications. For example, the present invention is applicable not only to a magneto-optical recording medium, but also to an add-on optical disk utilizing a thin metal film or a coloring matter recording material, or a rewritable optical disk utilizing the phase transition recording method. Also, the form of the medium is not limited to a disk shape but can be any other shape such a card or a tape.

The present invention includes all these modifications within the scope and spirit of the appended claims.

What is claimed is:

1. An optical information recording medium comprising:
   a recording surface formed by a recording layer provided on a substrate, said recording surface comprising information tracks each divided into a plurality of blocks, each of which includes a data area for information recording and a servo area comprising prepits for tracking signal detection;
   wherein said data area has a separating part the height of which is different from that of the information tracks and which is provided between information tracks adjacent to each other, and said servo area is not provided with said separating part; and
   wherein the recording layer of the information tracks and the recording layer of the separating part are continuously formed, free from discontinuity, and the difference in height between the information tracks and the separating part is greater than or equal to the thickness of said recording layer.

2. An optical information recording medium according to claim 1, wherein the surface of said servo area, other than the prepits, as well as said separating area are in the same plane.

3. An optical information recording medium according to claim 1, wherein said prepits comprise two wobble pits positioned on mutually opposite sides in the direction of the width of an information track with respect to the center line thereof.

4. An optical information recording medium according to claim 3, wherein said prepits further comprise a clock pit for detecting a clock signal.

5. An optical information recording medium comprising:
   a recording surface formed by a recording layer provided on a substrate, said recording surface comprising information tracks each divided into a plurality of blocks, each of which includes a data area for information recording and a servo area comprising prepits for tracking signal detection;
   wherein said data area has a separating part the height of which is different from that of the information tracks and which is provided between information tracks adjacent to each other, and said servo area is not provided with said separating part; and
   wherein the difference in height between the information tracks and the separating part is greater than or equal to the thickness of said recording layer, and the depth of said prepits and the difference in height between the information tracks and the separating part are equal to λ/4n, wherein λ is the wavelength of a light beam for reading information from said medium and n is the refractive index of said substrate.

6. An optical information recording medium according to claim 5, wherein the surface of said servo area, other than the prepits, as well as said separating area are in the same plane.

7. An optical information recording medium according to claim 5, wherein the surface of said servo area, other than the prepits, as well as the information tracks of said data area are in the same plane.

8. An optical information recording medium according to claim 5, wherein said prepits comprise two wobble pits positioned on mutually opposite sides in the direction of the width of an information track with respect to the center line thereof.

9. An optical information recording medium according to claim 8, wherein said prepits further comprise a clock pit for detecting a clock signal.

10. An optical information recording medium according to claim 5, wherein said recording layer comprises a magnetic film.

* * * * *

UNITED STATES PATENT AND TRADEMARK OFFICE
CERTIFICATE OF CORRECTION

PATENT NO. : 5,199,023　　　　　　　　Page 1 of 3
DATED : March 30, 1993
INVENTOR(S) : Masakuni Yamamoto, et al.

It is certified that error appears in the above-indentified patent and that said Letters Patent is hereby corrected as shown below:

ON THE COVER PAGE: ITEM [56] REFERENCES CITED

UNDER "FOREIGN PATENT DOCUMENTS"

Insert:　　--0210330　2/1987　European Pat. Off.
　　　　　　　　　0242078 10/1987　European Pat. Off.--.

COLUMN 2

Line 25, "Such" should read --Such an--;
　　Line 26, "an" should be deleted; and
　　Line 27, "portion" should read --portions--.

COLUMN 3

Line 58, "successes" should read
--is successive--.

COLUMN 4

Line 4, "example" should read --example,--.

COLUMN 5

Line 42, "Said" should read --The--.

UNITED STATES PATENT AND TRADEMARK OFFICE
CERTIFICATE OF CORRECTION

PATENT NO. : 5,199,023
DATED : March 30, 1993
INVENTOR(S) : Masakuni Yamamoto, et al.

It is certified that error appears in the above-indentified patent and that said Letters Patent is hereby corrected as shown below:

COLUMN 6

Line 25, "the (first occurrence) should read --this--.

COLUMN 7

Line 3, "width the center" should read --width, the center being--;
Line 5, "the pit." should read --a pit.--;
Line 14, "add on" should read --add-on--;
Line 31, "then of drawing" should read --then into a beam polarized perpendicularly to the plane of the drawing--; and
Line 39, "track" should read --track,--.

COLUMN 8

Line 46, "presence," should read --presence--.

UNITED STATES PATENT AND TRADEMARK OFFICE
CERTIFICATE OF CORRECTION

PATENT NO. : 5,199,023
DATED : March 30, 1993
INVENTOR(S) : Masakuni Yamamoto, et al.

It is certified that error appears in the above-indentified patent and that said Letters Patent is hereby corrected as shown below:

COLUMN 9

Line 24, "position, of pit" should read --position of a pit--;
Line 29, "VA" should read --$V_A$--;
Line 34, "the value" should read --a value--; and
Line 58, "case" should read --case,--.

Signed and Sealed this

Seventh Day of June, 1994

BRUCE LEHMAN

*Attest:*

*Attesting Officer*      Commissioner of Patents and Trademarks